US006758457B2

(12) United States Patent
Nicolino et al.

(10) Patent No.: US 6,758,457 B2
(45) Date of Patent: Jul. 6, 2004

(54) CONNECTING MEMBER FOR A FAST-FIT SAFETY COUPLING

(75) Inventors: Aldo Nicolino, Caselette (IT); Giandomenico Caradonna, Turin (IT); Massimo Pellegrino, Turin (IT)

(73) Assignee: Pres-Block S.p.A., Via Alpignano (IT)

( * ) Notice: Subject to any disclaimer, the term of this patent is extended or adjusted under 35 U.S.C. 154(b) by 29 days.

(21) Appl. No.: 10/182,195

(22) PCT Filed: Jan. 25, 2001

(86) PCT No.: PCT/IT01/00040
§ 371 (c)(1),
(2), (4) Date: Dec. 3, 2002

(87) PCT Pub. No.: WO01/55632
PCT Pub. Date: Aug. 2, 2001

(65) Prior Publication Data
US 2004/0084650 A1 May 6, 2004

(30) Foreign Application Priority Data
Jan. 28, 2000 (IT) .................................. TO2000A0091

(51) Int. Cl.[7] ............................................... F16L 37/42
(52) U.S. Cl. .............................. 251/149.6; 137/614.05
(58) Field of Search ..................... 251/142, 149–149.9; 137/614–614.05

(56) References Cited

U.S. PATENT DOCUMENTS 5,546,985 A  *  8/1996  Bartholomew ......... 137/614.04
5,911,403 A  *  6/1999  deCler et al. ............ 251/149.6
5,975,489 A  * 11/1999  deCler et al. ............ 251/149.1
6,024,124 A  *  2/2000  Braun et al. ........... 137/614.03
6,158,717 A  * 12/2000  Van Scyoc et al. ...... 251/149.6

FOREIGN PATENT DOCUMENTS

EP      0 275 677 A1     7/1988
WO      WO 99/19657      4/1999

OTHER PUBLICATIONS

Preliminary EPO Report.
* cited by examiner

Primary Examiner—Paul J. Hirsch
(74) Attorney, Agent, or Firm—Blank Rome LLP

(57) ABSTRACT

A connecting member (4) for a fast-fit safety coupling (1), having a tubular main member (10) connectable to a first conduit (2) for conducting pressurized fluid; a valve member (11) fitted inside the main member (10) to slide axially between a first work position separating the first conduit (2) in fluidtight manner from the outside, and an open second work position; first retaining means (18) for releasably connecting an endpiece (5) of a second conduit (3) to the valve member (11); second retaining means (17) for releasably connecting the valve member (11), in the second work position and connected to the endpiece (5), to the main member (10); and control means (70, 71, 72, 54) for disconnecting the connecting member (4) and the endpiece (5). The control means have a first actuating member (70) fitted in angularly fixed manner to the valve member (11) and movable axially, with respect to the valve member and upon deactivation of the second retaining means, to release the first retaining means (18); a second actuating member (71) connected in axially fixed, rotary manner to the valve member (11); and cam transmission means (72) for converting rotation of the second actuating member (71) into axial displacement of the first actuating member (70) to release the endpiece (5).

10 Claims, 5 Drawing Sheets

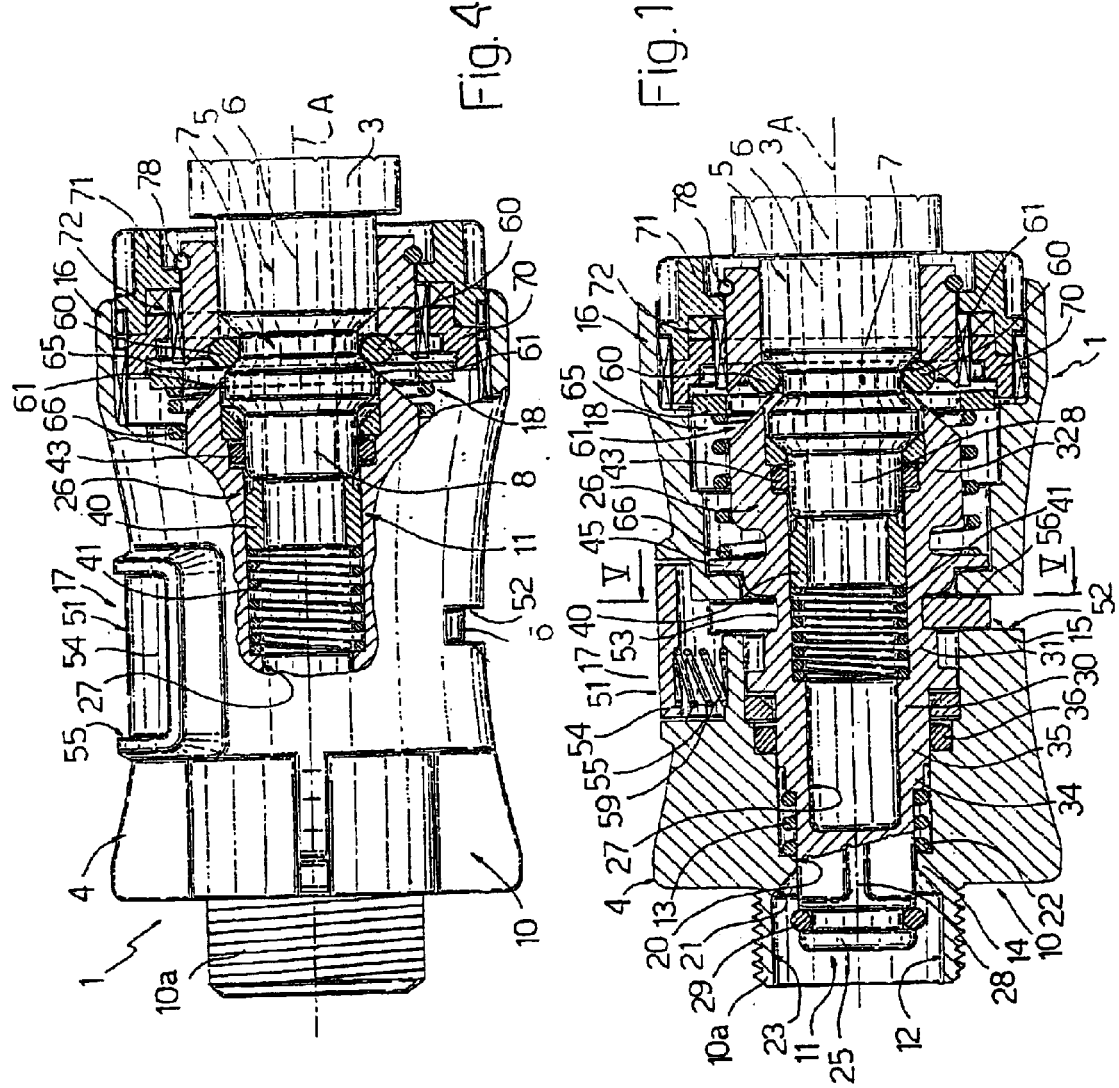

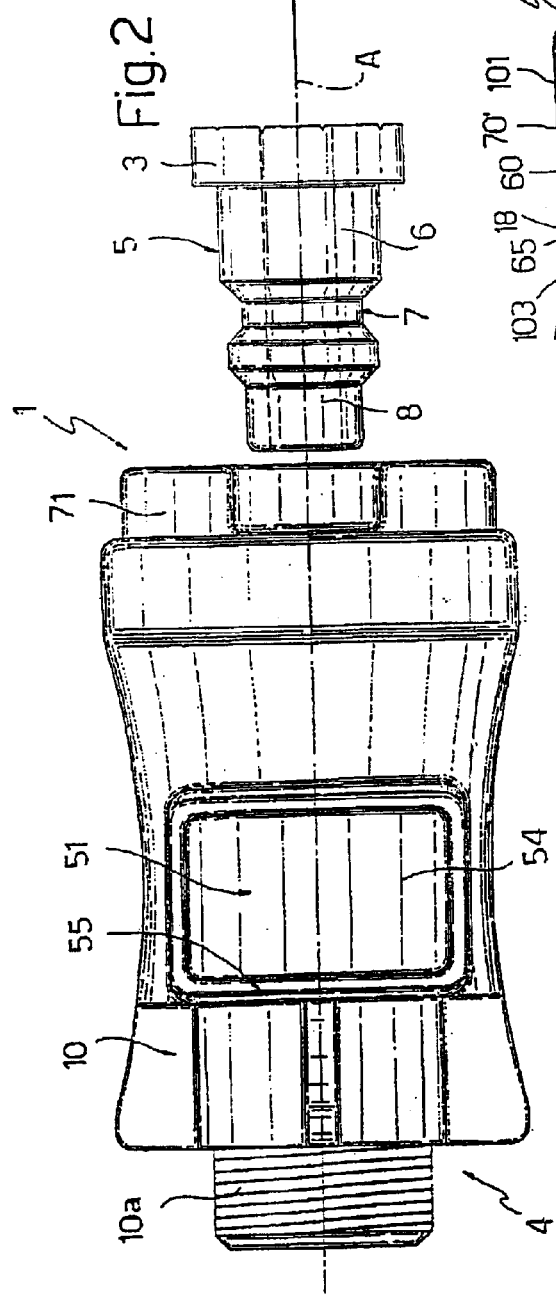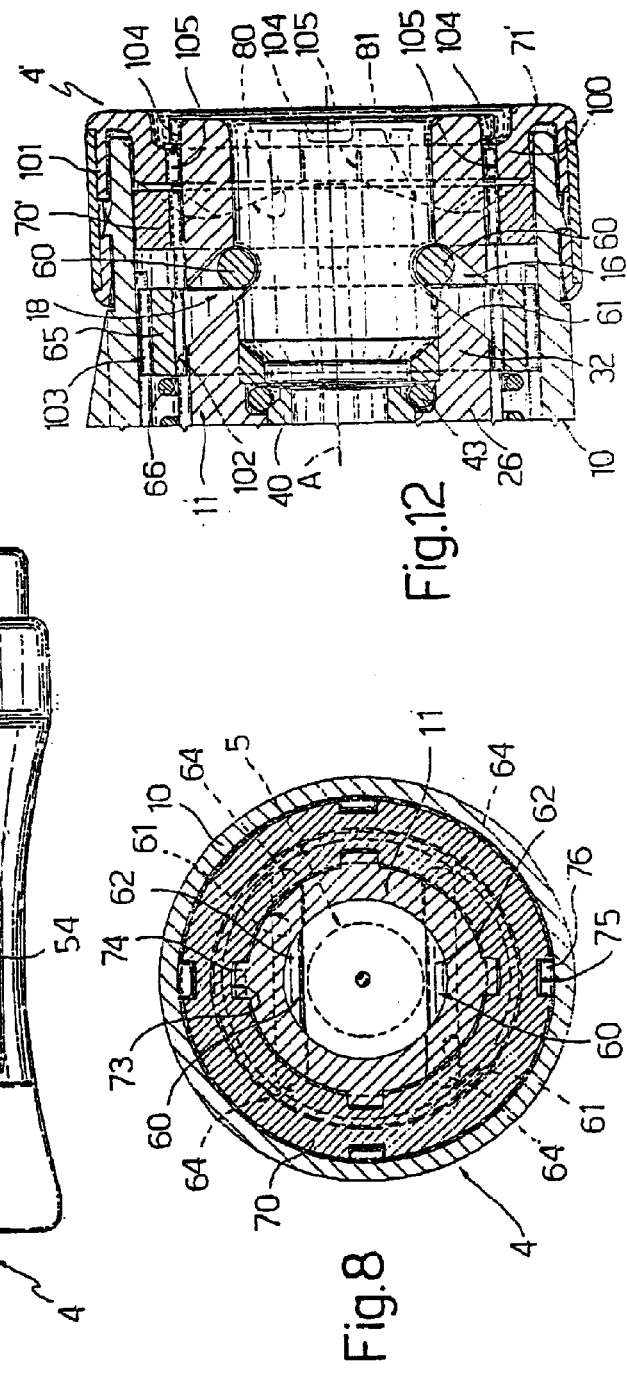

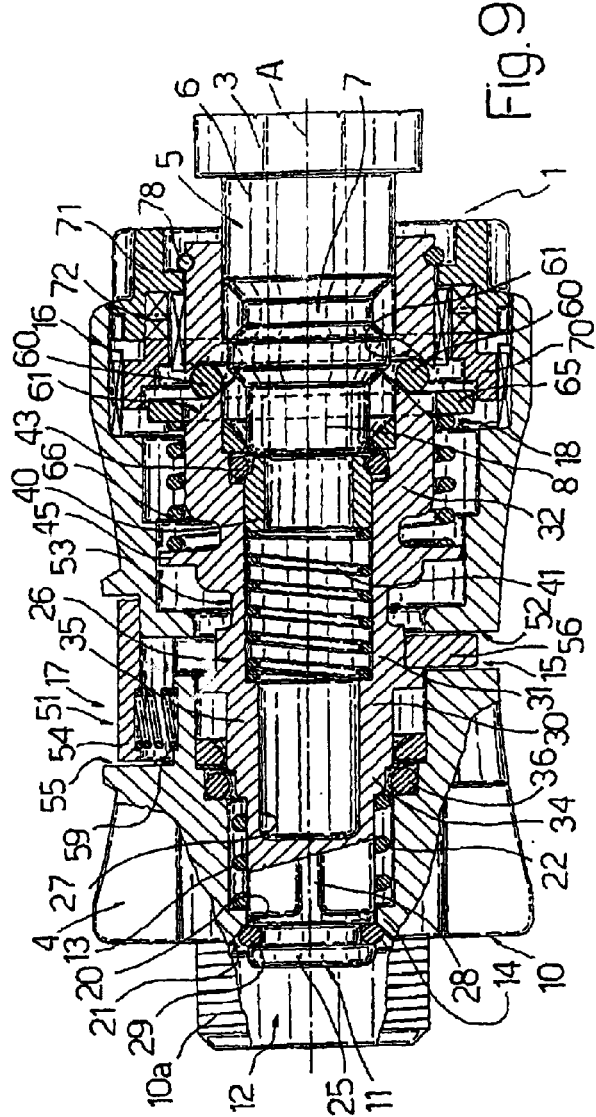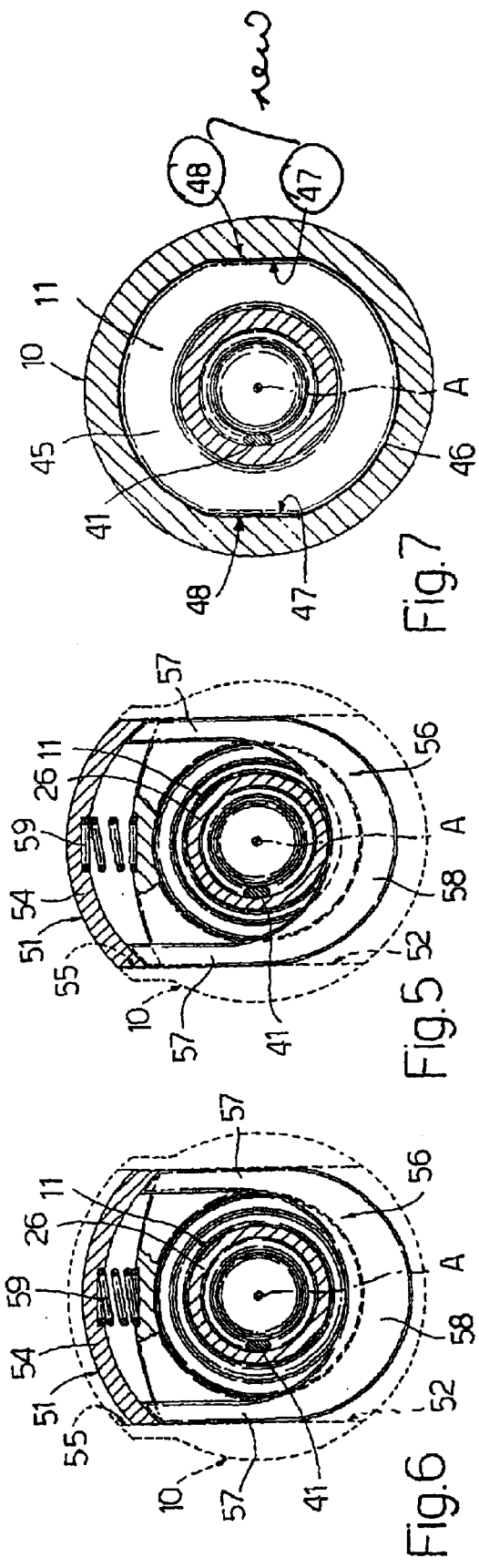

US 6,758,457 B2

CONNECTING MEMBER FOR A FAST-FIT SAFETY COUPLING

TECHNICAL FIELD

The present invention relates to a connecting member for a fast-fit safety coupling for fluidtight connection of two pressurized-operating-fluid, in particular compressed-air or—gas, conduits.

BACKGROUND ART

Known fast-fit non-safety couplings substantially comprise a normally substantially cylindrical connecting member connected to a first of the conduits; and a normally substantially cylindrical endpiece connected to a second of the conduits and which fits releasably into an engaged position inside the connecting member.

The connecting member comprises a hollow main member connected to the first conduit; a slide valve member fitted to slide axially inside the main member; a cylindrical helical spring interposed between the main member and the valve member, and which exerts axial pressure on the valve member to keep it in a first work position isolating the first conduit in fluidtight manner from the outside; and releasable stop means for retaining the endpiece of the connecting member in the engaged position, wherein the endpiece exerts opposite pressure on the valve member to overcome the pressure of the spring and so keep the valve member in a second work position permitting fluid flow between the first and second conduit.

A drawback of such couplings is that, when disconnected, the endpiece, pushed by the pressure of the fluid and the return pressure of the spring, tends to be released violently from the connecting member and possibly strike and, at times, injure the operator, or at least damage any nearby machinery or other objects.

To eliminate the above drawback, fast-fit safety couplings have been devised, as described, for example, in international Patent Application n. WO99/19657 filed by the present Applicant, and wherein the main member of the connecting member comprises axially spaced first and second releasable stop means. More specifically, the first stop means cooperate with the endpiece to lock it in the engaged position; and the second stop means cooperate with the endpiece to keep it, upon release of the first stop means and when disconnected from the connecting member, in a withdrawn safety position, wherein the endpiece is mechanically connected to the main member, and the valve member is set to the first work position isolating the first conduit in fluidtight manner and wherein the operating fluid inside the coupling, between the first and second conduit, is allowed to flow out.

The first stop means are interposed between the main member and the valve member, and the second stop means comprise releasable retaining means carried by the valve member and which cooperate with the endpiece to make it integral with the valve member as the endpiece moves between the withdrawn safety position and the forward engaged position.

More specifically, the second stop means comprise a selection ring nut, which is carried by the valve member, is normally maintained by a spring in a predetermined axial position on the valve member, and can be pushed axially—in opposition to the spring and in the opposite direction to that in which the valve member moves from the second to the first work position—to release the retaining means.

Though in many respects extremely advantageous and safe, the above solution still leaves room for improvement.

In particular, in the event the user, when releasing the first stop means and so moving the valve member from the second to the first work position, inadvertently grips and prevents the selection ring nut from moving integrally with the valve member, the retaining means may be released simultaneously, thus resulting in violent release of the endpiece from the connecting member. Axially retaining the selection ring nut with respect to the valve member, in fact, results in relative movement of the selection ring nut with respect to the valve member in the retaining means release direction.

DISCLOSURE OF THE INVENTION

It is an object of the present invention to provide a connecting member for a fast-fit safety coupling, designed to eliminate the above drawback typically associated with the aforementioned known safety couplings.

According to the present invention, there is provided a connecting member for a fast-fit safety coupling, as claimed in claim 1.

BRIEF DESCRIPTION OF THE DRAWINGS

A preferred, non-limiting embodiment of the present invention will be described by way of example with reference to the accompanying drawings, in which:

FIG. 1 shows an axial section of a fast-fit safety coupling having a connecting member in accordance with the present invention, and an endpiece connected to the connecting member in the engaged position;

FIG. 2 shows a side view of the FIG. 1 connecting member and endpiece in the disconnected position;

FIG. 4 shows an axial section of the FIG. 1 coupling in the safety position;

FIG. 5 shows a section along line V—V in FIG. 1;

FIG. 6 shows a smaller-scale section along line VI—VI in FIG. 3;

FIG. 7 shows a smaller-scale section along line VII—VII in FIG. 3;

FIG. 8 shows a section along line VIII—VIII in FIG. 3;

FIG. 9 shows an axial section of the FIG. 1 coupling as the endpiece is disconnected fully from the connecting member;

FIG. 12 shows a partial axial section of a possible variation of the FIG. 1 connecting member.

BEST MODE FOR CARRYING OUT THE INVENTION

Figure 3:
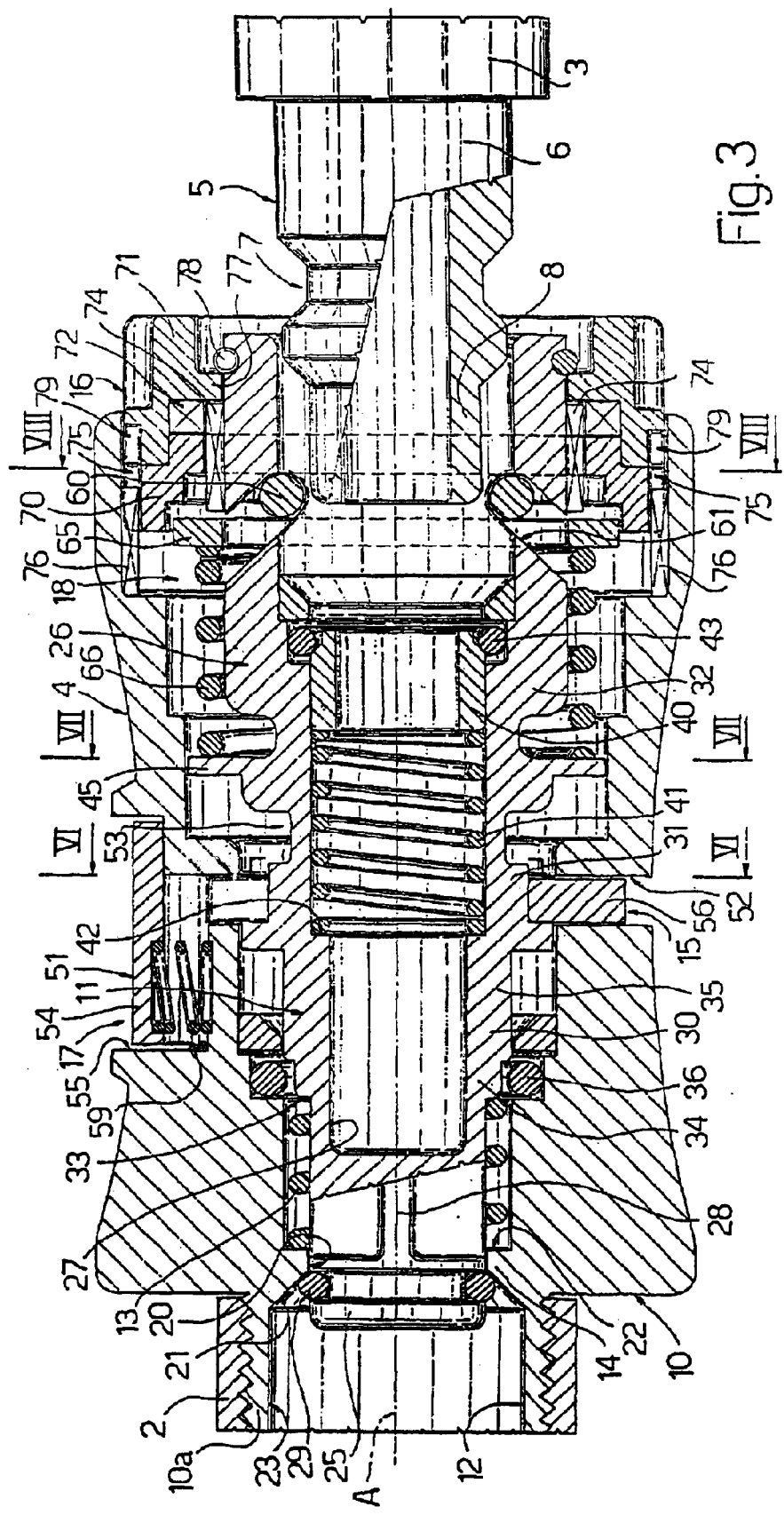
FIG. 3 shows a larger-scale axial section of connection of the FIG. 1 connecting member and endpiece.

With reference to FIGS. 1, 3, 4 and 9, number 1 indicates as a whole a fast-fit safety coupling for fluidtight connection of two conduits 2, 3 (FIG. 3) for conducting pressurized operating fluid, in particular compressed air or gas.

Coupling 1 has a longitudinal axis A, and comprises a connecting member 4 in accordance with the present invention, substantially cylindrically symmetrical with respect to axis A, and connectable to conduit 2; and an endpiece 5 (known and not forming part of the present invention) which is also substantially cylindrically symmetrical, is connected to conduit 3, and is connectable releasably to connecting member 4.

With reference to FIGS. 1 to 4 and FIG. 9, endpiece 5 is substantially tubular and of axis A, and comprises a cylindrical main portion 6 connected, in use, to conduit 3 and having an outer annular retaining groove 7, and a cylindrical free-end portion 8 smaller in diameter than and connected to portion 6.

With reference to FIGS. 1 to 9, connecting member 4 comprises an outer main member 10, which is substantially tubular of axis A and has an externally threaded sleevelike end portion 10a connected to conduit 2; a slide valve member 11 mounted to slide axially inside main member 10 and defining, with end portion 10a of main member 10, a substantially cylindrical chamber 12 of axis A communicating, in use, with conduit 2; a cylindrical helical spring 13 of axis A, which is housed inside main member 10 and exerts axial pressure on valve member 11 to keep it in a first work position (FIGS. 3 and 9) in which valve member 11 rests against an annular, radially inner projection 14 of main member 10 and separates chamber 12 and conduit 2 in fluidtight manner from the outside; a releasable first stop mechanism 15 defining, in use, a forward engaged position (FIG. 1) of endpiece 5 inside connecting member 4, wherein endpiece 5 exerts opposite pressure on valve member 11 to overcome the pressure exerted by spring 13 and so keep valve member 11 in a second work position (FIG. 1) permitting fluid flow between conduits 2 and 3; and a releasable second stop mechanism 16 which cooperates with endpiece 5 to keep it, upon release of stop mechanism 15 and when disconnecting endpiece 5 from connecting member 4, in a withdrawn safety position (FIG. 4) wherein endpiece 5 is connected mechanically to connecting member 4, and valve member 11 is set to the first work position and allows the operating fluid between projection 14 and conduit 3 to flow out.

Stop mechanism 15 comprises releasable connecting means 17 between main member 10 and valve member 11; and stop mechanism 16 comprises releasable retaining means 18 carried by valve member 11 and, which cooperate with groove 7 on endpiece 5 to make endpiece 5 integral with valve member 11 between the withdrawn safety position and the forward engaged position.

With particular reference to FIG. 3, projection 14 has a cylindrical surface 20 of axis A defining a sliding seat for valve member 11, and is defined, towards conduit 2, by a truncated-cone-shaped surface 21 of axis A with its concavity facing conduit 2, and, on the opposite side, by a circular annular surface 22 also of axis A and defining an axial stop for spring 13.

Chamber 12 is thus defined by a radially inner, cylindrical surface 23 of end portion 10a of main member 10, by surface 21 of projection 14, and by valve member 11.

With reference to FIGS. 1, 3, 4 and 9, valve member 11 is substantially elongated-cup-shaped of axis A, and is defined by a disk-shaped end wall 25, and by a substantially cylindrical lateral wall 26 defining an inner cavity 27 and connected to disk-shaped wall 25 by a short cross portion 28 about which spring 13 is wound, and which, in the second work position of valve member 11, permits fluid flow between chamber 12 and cavity 27.

More specifically, disk-shaped wall 25, together with cross portion 28, is engaged in axially sliding manner inside cylindrical surface 20 of projection 14, and is fitted externally with a sealing ring 29, of axis A, which, in the first work position of valve member 11, rests against surface 21 of projection 14 to separate chamber 12 and conduit 2 from cavity 27, and therefore from the outside, in fluidtight manner.

Lateral wall 26 is defined by a number of substantially cylindrical portions 30, 31, 32 decreasing in outside diameter towards cross portion 28.

Of portions 30, 31, 32 of lateral wall 26, portion 30 defines, immediately adjacent to cross portion 28, an annular stop shoulder 33 for spring 13 and axially facing surface 22 of projection 14. More specifically, portion 30 is defined by two cylindrical portions 34, 35, of which portion 34 is contiguous to shoulder 33 and smaller in diameter and length than portion 35.

A sealing ring 36 is interposed between portion 30 of valve member 11 and main member 10, and engages a respective annular groove on main member 10. In the first work position of valve member 11, ring 36 is positioned between projection 14 and portion 34 of portion 30 to allow operating fluid to flow out from cavity 27; whereas, in the second work position of valve member 11, ring 36 is compressed between projection 14 and portion 35 of portion 30 to provide a fluidtight seal between main member 10 and valve member 11.

Portions 31 and 32 of lateral wall 26 are located one after the other as of portion 30 and away from disk-shaped wall 25.

A cylindrical sleeve 40 is housed in axially sliding manner inside portion 32 of lateral wall 26, and is loaded axially by a cylindrical helical spring 41 housed inside cavity 27 of valve member 11 and interposed between one end of sleeve 40 and an annular shoulder 42 formed on a radially inner surface of portion 31 of lateral wall 26. A sealing ring 43, housed in an inner annular groove on portion 32 of lateral wall 26, is compressed between valve member 11 and end portion 8 of endpiece 5, in the forward engaged position of endpiece 5, and defines an axial stop preventing sleeve 40 from being expelled from cavity 27 by spring 41 in the absence of endpiece 5.

When inserted inside cavity 27 of valve member 11, end portion 8 of endpiece 5 exerts axial pressure on sleeve 40 in opposition to and greater than that of spring 41 to move sleeve 40 axially towards disk-shaped wall 25.

Portion 32 of lateral wall 26 has an outer annular flange 45, on the peripheral edge 46 of which are formed two parallel flat portions 47 (FIG. 7) located on diametrically opposite sides of axis A and which cooperate in sliding manner with respective flat portions 48 on main member 10 to define a prismatic coupling between, and prevent relative rotation of, main member 10 and valve member 11.

With reference to FIGS. 1 to 6 and FIG. 9, connecting means 17 comprise a push-button member 51 carried by main member 10 and movable, perpendicularly to axis A and inside a respective transverse seat 52 on main member 10, between a coupling position (FIGS. 1 and 5), in which it engages an outer annular groove 53, formed in portion 31 of lateral wall 26 of valve member 11, to define the second work position of valve member 11 and, hence, the engaged position of endpiece 5, and a release position (FIGS. 3, 4, 6, 9), in which it is detached from groove 53.

More specifically, push-button member 51 comprises a dome-shaped actuating portion 54 having a substantially rectangular outer edge and housed loosely inside an outer recess 55, of corresponding shape, formed in main member 10 and communicating with seat 52; and a substantially U-shaped guillotine portion 56, which projects from actuating portion 54, is housed in sliding manner inside seat 52, and is fitted radially loosely to the outside of portion 31 of lateral wall 26 of valve member 11. More specifically, guillotine portion 56 comprises two straight, parallel branches 57 projecting from opposite sides of actuating portion 54; and an arc-shaped latch portion 58 connecting branches 57 and which cooperates with the outer surface of portion 31 of lateral wall 26 of valve member 11 and with groove 53.

Push-button member 51 is loaded, perpendicularly to axis A, by a spring 59 interposed between a bottom surface of recess 55 and actuating portion 54, so that latch portion 58 of guillotine portion 56 is maintained permanently contacting the outer surface of portion 31 of valve member 11 on the diametrically opposite side to actuating portion 54.

With reference to FIGS. 1, 3, 4, 8 and 9, retaining means 18 comprise two bars 60, which are housed in respective transverse grooves 61 formed in portion 32 of lateral wall 26 of valve member 11, on diametrically opposite sides of axis A, and slide, inside grooves 61 and to and from axis A, between a first work position (FIGS. 1, 3, 4 and 8) in which respective intermediate portions 62 project partly inside cavity 27 and engage groove 7 on endpiece 5 to mechanically connect valve member 11 and endpiece 5, and a second work position (FIG. 9) in which intermediate portions 62 are located between the radially inner and outer surfaces of portion 32 of lateral wall 26 of valve member 11 to permit release of endpiece 5 from valve member 11.

More specifically, grooves 61 have respective axes parallel to each other and perpendicular to axis A, and are each defined by parallel sides sloping with respect to axis A and diverging with respect to the corresponding sides of the other groove 61 towards disk-shaped wall 25.

Each bar 60 also has opposite ends 64 projecting outwards with respect to portion 32 of lateral wall 26 of valve member 11.

Retaining means 18 also comprise a push ring 65 fitted in axially sliding manner about portion 32 of lateral wall 26 of valve member 11, and maintained resting against ends 64 of bars 60 by a cylindrical helical spring 66 wound coaxially about portion 32 and resting against flange 45. In the absence of external loads, bars 60 are maintained in the first work position by spring 66 and push ring 65.

An important aspect of the present invention (FIGS. 1, 3, 4, 8, 9, 10, 11a, 11b) is that stop mechanism 16 also comprises a first actuating ring nut 70 fitted in angularly fixed, axially sliding manner to portion 32 of lateral wall 26 of valve member 11 inside main member 10, and cooperating with ends 64 of bars 60 on the opposite side with respect to push ring 65; a second actuating ring nut 71 operated from the outside and fitted in axially fixed, rotary manner to portion 32; and cam transmission means 72 interposed between ring nuts 70 and 71 and for converting rotation of ring nut 71 about axis A into axial translation of ring nut 70 in opposition to spring 66, so as to move bars 60 into the second work position and release bars 60 from groove 7 on endpiece 5.

Figure 10:
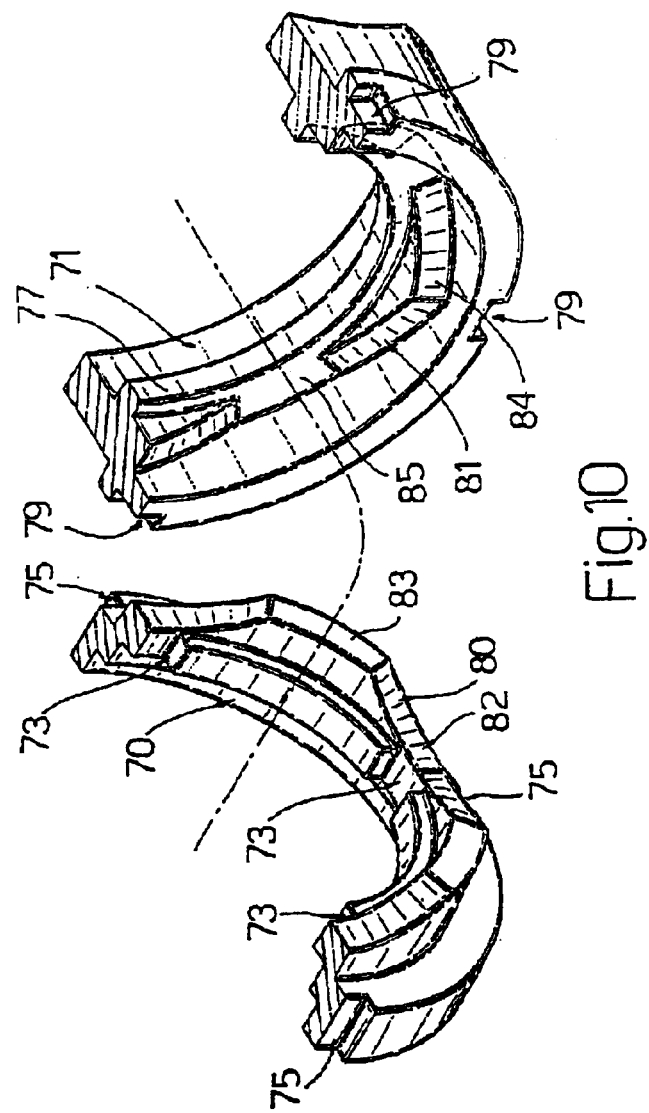
FIG. 10 shows a partial, larger-scale, exploded view in perspective of two ring nuts of the FIG. 1 connecting member for fully disconnecting the endpiece from the connecting member.

With particular reference to FIGS. 8 and 10, a radially inner surface of ring nut 70 has a number (four, in the example shown) of first radial grooves 73 equally spaced angularly about axis A and engaged in sliding manner by respective outer radial projections 74 on portion 32 of lateral wall 26 of valve member 11. Similarly, a radially outer surface of ring nut 70 has a number (four, in the example shown) of second radial grooves 75 equally spaced angularly about axis A and engaged in sliding manner by respective inner radial projections 76 on main member 10.

With reference to. FIGS. 1, 3, 4, 9 and 10, ring nut 71 comprises an inner annular projection 77 fitted in rotary manner to portion 32 of lateral wall 26 of valve member 11 and locked axially, on one side, by projections 74 and, on the opposite side, by a retaining ring 78 fitted to the outside of portion 32.

A radially outer surface of ring nut 71 has four radial grooves 79 equally spaced angularly about axis A and engaged by projections 76 in the second work position of valve member 11 or in the forward engaged position of endpiece 5, so as to prevent ring nut 71 from being activated before push-button member 51 is set to the release position. The axial length of projections 76 is such as to permit release of grooves 79 of ring nut 71 in the first work position of valve member 11.

Figure 11:
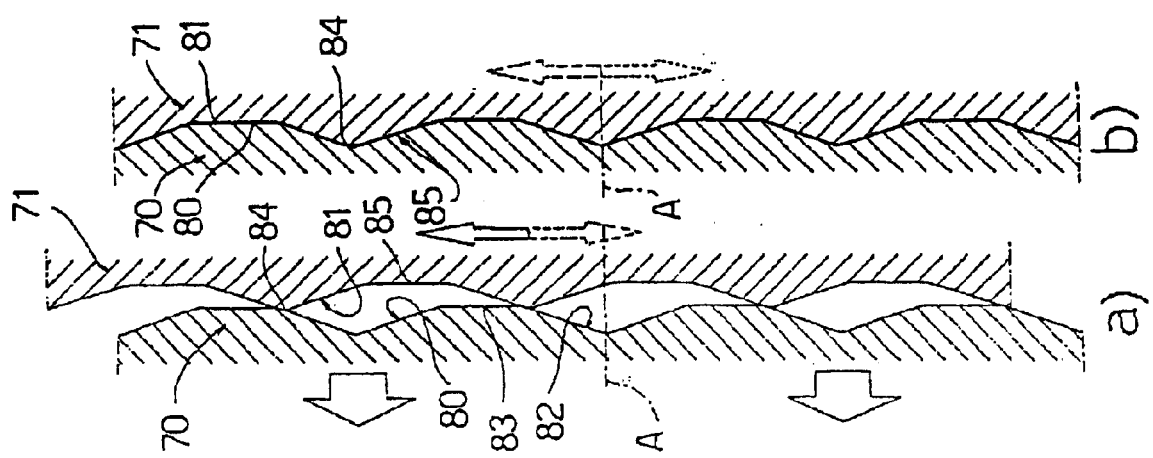
FIGS. 11a and 11b show developed plan views of mating face edges of the FIG. 10 ring nuts in the FIG. 9 position and FIG. 1, 3 and 4 positions respectively.

With particular reference to FIGS. 10 and 11, cam transmission means 72 are defined by respective contoured face surfaces 80, 81 of ring nuts 70, 71, mating with each other and having complementary edges. More specifically, face surface 80 is defined by a number (four, in the example shown) of troughs 82 having, in developed plan view, a V-shaped outer edge and alternating with respective flat portions 83; while face surface 81 is defined by a number of crests 84 having edges corresponding in shape to those of troughs 82 and also alternating with respective flat portions 85.

Assembly of coupling 1 will be described as of an initial configuration (FIG. 2) in which endpiece 5 is fully withdrawn from connecting member 4; valve member 11 is in the first work position (FIG. 3) separating chamber 12 from cavity 27 in fluidtight manner by means of ring 29; push-button member 51 is in the release position; sleeve 40 is pushed by spring 41 against sealing ring 43; bars 60, subjected to the action of spring 66 and push ring 65, are in the first work position, in which intermediate portions 62 project inside cavity 27; and troughs 82 of face surface 80 of ring nut 70 are engaged by respective crests 84 of face surface 81 of ring nut 71.

Endpiece 5 is fitted to connecting member 4 by simply inserting endpiece 5 in one movement inside cavity 27 of valve member 11. At this stage, on contacting main portion 6 of endpiece 5, the outside diameter of which is substantially equal to the inside diameter of portion 32 of lateral wall 26 of valve member 11, bars 60 are pushed into the second work position. As soon as groove 7 in endpiece 5 reaches bars 60, these are pushed by spring 66 along respective grooves 61 back into the first work position to engage groove 7 and so mechanically connect endpiece 5 and valve member 11 (FIG. 4).

At this point, end portion 8 of endpiece 5 comes into contact with sleeve 40 and pushes it towards disk-shaped wall 25 of valve member 11 to fully compress spring 41, which is less stiff than spring 13. As endpiece 5 continues to be pushed axially inside connecting member 4, valve member 11 moves, integrally with endpiece 5, from the first to the second work position, thus compressing spring 13 and gradually moving ring 29 away from the surface of projection 14, so that chamber 12 communicates with cavity 27 via cross portion 28 of valve member 11, and sealing ring 43 is compressed between end portion 8 of endpiece 5 and portion 32 of lateral wall 26 of valve member 11.

As groove 53 in valve member 11 reaches guillotine portion 56, the thrust exerted by spring 59 causes push-button member 51 to slide inside seat 52 on main member 10 and click into the coupling position inside groove 53, thus locking valve member 11 in the second work position permitting fluid flow between conduits 2 and 3, and defining the forward engaged position of endpiece 5 inside connecting member 4 (FIG. 1).

At this stage, the operating fluid from conduit 2 flows through cross portion 28, projecting inside chamber 12, and through cavity 27 and sleeve 40 into endpiece 5 and conduit 3. In this configuration, rings 36 and 43 ensure perfect outward sealing of coupling 1.

Endpiece 5 is disconnected from connecting member 4 by acting separately and successively on push-button member 51 and actuating ring nut 71. More specifically, in the engaged position of endpiece 5, ring nut 71 is locked axially to valve member 11 between projections 74 and retaining ring 78, and is prevented from being rotated by radial projections 76 on main member 10 engaging grooves 79 (FIG. 1).

Pressure must therefore be applied, perpendicularly to axis A, on actuating portion 54 of push-button member 51 to release guillotine portion 56 from groove 53. At which point, the pressure of spring 13 and the pressurized fluid pushes valve member 11 from the second to the first work position, in which, ring 29 contacts surface 21 of projection 14, so that chamber 12, and therefore conduit 2, is separated from the rest of coupling 1. At the same time, ring nuts 70, 71 are moved integrally with valve member 11 and slide axially with respect to main member 10. At this stage, endpiece 5 is still secured to valve member 11 by bars 60 engaging groove 7.

Upon valve member 11 reaching the first work position, grooves 79 on ring nut 71 are released from projections 76 on main member 10, and ring 43 is positioned between the small-diameter portion 34 of valve member 11 and the radially inner surface of main member 10, thus enabling the operating fluid between projection 14 and conduit 3 to flow out.

Only at this point can actuating ring nut 71 be rotated in either direction about axis A; crests 84 of face surface 81 of ring nut 71 slide along the sloping sides of corresponding troughs 82 of face surface 80 of ring nut 70 up to flat portions 83; and, at the same time, ring nut 70 moves axially towards disk-shaped wall 25, and moves bars 60 into the second work position in opposition to spring 66, thus releasing endpiece 5, which is detached in perfectly controlled manner owing to the absence of any pressure inside cavity 27 of valve member 11 (FIG. 9).

The variation in FIG. 12 shows a connecting member 4', which is similar to connecting member 4, and the component parts of which are indicated, where possible, using the same reference numbers as for the corresponding parts of connecting member 4.

Connecting member 4' mainly differs from connecting member 4 by comprising a ring nut 71', which performs the same function as ring nut 71, but is clicked on to the outside of main member 10.

More specifically, ring nut 71' comprises a substantially cylindrical annular main portion 100 identical to ring nut 71 and housed between portion 32 of lateral wall 26 of valve member 11 and main member 10; and an annular peripheral portion 101 connected at one end to main portion 100 and clicked on to the outer surface of main member 10.

Being clicked on to main member 10, ring nut 71' is free to rotate about axis A, but is axially fixed Connecting member 4' also comprises a ring nut 70', which is identical to ring nut 70, is fitted in angularly fixed, axially sliding manner to portion 32 of lateral wall 26 of valve member 11, and is located between ring nut 71' and bars 60.

In this case, too, ring nuts 70' and 71' are connected to each other by respective complementary face surfaces 80, 81.

Connecting member 4' also differs from connecting member 4 by push ring 65 defining, along its radially inner and outer surfaces, respective splined couplings 102, 103 for connection to valve member 11 and main member 10.

At the free end facing away from disk-shaped wall 25, valve member 11 comprises four parallelepiped-shaped projections 104, which, in the second work position of valve member 11, engage respective complementary recesses 105 formed in the radially inner surface of ring nut 71', thus preventing any rotation of ring nut 71' as long as valve member 11 is in the second work position. That is, push-button member 51 must be operated first to disconnect connecting member 41 and endpiece 5.

The advantages of connecting members 4, 4' according to the present invention will be clear from the foregoing description.

In particular, ring nuts 70, 70', 71, 71' and the way in which they are retained to valve member 11 and to main member 10 rule out any possibility of stop mechanism 16 being deactivated before or simultaneously with release of stop mechanism 15, thus bypassing the safety function of coupling 1.

In the case of connecting member 4, in fact, ring nut 71 is prevented from being rotated until grooves 79 of ring nut 71 are released by respective projections 76 on main member 10—which only occurs when valve member 11 is in the first work position, i.e. when conduit 2 is separated in fluidtight manner from the outside. Moreover, any inadvertent axial retention of ring nut 71 by the user when operating push-button member 51 has no effect whatsoever on bars 60, and, therefore, can in no way result in simultaneous release of endpiece 5.

Similarly, in the case of connecting member 4', ring nut 71' is prevented from being rotated until projections 104 on valve member 11 are released from respective recesses 105 on ring nut 71'—which only occurs when valve member 11 is in the first work position (FIG. 12).

Clearly changes may be made to connecting members 4, 4' according to the present invention, without, however, departing from the scope of the accompanying claims.

What is claimed is:

1. A connecting member (4, 4') connectable to a first conduit (2) for conducting a pressurized operating fluid, and fittable releasably to an endpiece (5) of a second conduit (3) for conducting said operating fluid, so as to define a fast-fit safety coupling (1); said connecting member (4, 4') having a longitudinal axis (A) and comprising:

a substantially tubular main member (10) connectable to said first conduit (2);

a slide valve member (11) fitted inside said main member (10) so as to slide axially between a first work position wherein said valve member (11) separates said first conduit (2) in fluidtight manner from the outside, and a second work position permitting fluid flow between said first and said second conduit (2, 3);

first retaining means (18) for releasably connecting said endpiece (5) to said valve member (11);

second retaining means (17) for releasably connecting said valve member (11), in said second work position and connected to said endpiece (5), to said main member (10); and control means (70, 70', 71, 71', 72, 54) for disconnecting said connecting member (4, 4') and said endpiece (5) by successively releasing said second retaining means (17)—thus moving said valve member (11) into said first work position and permitting outflow of the operating fluid between said main member (10) and the endpiece (5)—and said first retaining means (18); said control means (70, 70', 71, 71', 72, 54) comprising a first actuating member (70, 70') fitted in angularly fixed manner to said valve member (11) and movable axially with respect to the valve member (11) in opposition to elastic return means (66) to release said first retaining means (18);

characterized in that said control means (70, 70', 71, 71', 72, 54) comprise a second actuating member (71, 71'), which is axially fixed and rotatable with respect to said valve member (11) at least in said first work position of the valve member (11); and cam transmission means (72) interposed between said first and said second actuating member (70, 70', 71, 71') and for converting rotation of said second actuating member (71, 71') into axial displacement of said first actuating member (70, 70') in opposition to said elastic means (66).

2. A connecting member as claimed in claim 1, characterized in that said valve member (11) has an inner cavity (27) engaged, in use, by said endpiece (5); and in that said first retaining means (18) comprise a number of engaging members (60), which are mounted to slide inside respective seats (61) formed in a lateral wall (26) of said valve member (11) defining said cavity (27), are pushed by said elastic means (66) into a coupling position engaging an annular groove (7) on said endpiece (5), and are moved into a release position releasing said groove (7) on said endpiece (5) by the thrust generated by said first actuating member (70, 70') moving axially in opposition to said elastic means (66).

3. A connecting member as claimed in claim 2, characterized in that said engaging members (60) are located between said elastic means (66) and said first actuating member (70, 70').

4. A connecting member as claimed in claim 3, characterized in that said engaging members comprise two transverse bars (60) extending parallel to each other on diametrically opposite sides of said longitudinal axis (A).

5. A connecting member as claimed in claim 1, characterized by comprising disabling means (76, 79, 104, 105) for preventing rotation of said second actuating member (71, 71') and which are selectively deactivated in said first work position of said valve member (11).

6. A connecting member as claimed in claim 5, characterized in that said disabling means comprise splined coupling means (79, 76) between said second actuating member (71) and said main member (10), and which are deactivated by movement of said valve member (11) into said first work position.

7. A connecting member as claimed in claim 1, characterized in that said cam transmission means (72) comprise a first and a second surface (80, 81) mating with each other and formed on said first and said second member (70, 70', 71, 71') respectively.

8. A connecting member as claimed in claim 7, characterized in that said first surface (80) comprises a number of troughs (82), and said second surface (81) comprises a number of crests (84) corresponding in shape to that of said troughs (82).

9. A connecting member as claimed in claim 8, characterized in that said troughs (82) and said crests (84) have respect V-shaped profiles.

10. A connecting member as claimed in claim 8 or 9, characterized in that said first and said second surface (80, 81) comprise a number of flat portions (83, 85) alternating with relative said troughs (82) and relative said crests (84) respectively.

* * * * *